(12) United States Patent
Okuto

(10) Patent No.: US 7,579,806 B2
(45) Date of Patent: Aug. 25, 2009

(54) DIRECT METHANOL FUEL CELL PACK HEATING SYSTEM

(76) Inventor: Tadashi Okuto, 100 John St., Apt. 2504, New York, NY (US) 10038

( * ) Notice: Subject to any disclaimer, the term of this patent is extended or adjusted under 35 U.S.C. 154(b) by 0 days.

(21) Appl. No.: 11/569,467

(22) PCT Filed: Jun. 10, 2005

(86) PCT No.: PCT/IB2005/051933

§ 371 (c)(1),
(2), (4) Date: Nov. 21, 2006

(87) PCT Pub. No.: WO2005/120161

PCT Pub. Date: Dec. 22, 2005

(65) Prior Publication Data

US 2008/0030164 A1    Feb. 7, 2008

Related U.S. Application Data

(60) Provisional application No. 60/521,654, filed on Jun. 11, 2004.

(51) Int. Cl.
*H01M 10/44* (2006.01)
*H01M 10/46* (2006.01)
(52) U.S. Cl. ............... 320/101; 429/12; 429/20
(58) Field of Classification Search ............. 320/112, 320/101; 429/12, 20, 22, 24, 26
See application file for complete search history.

(56) References Cited

U.S. PATENT DOCUMENTS

| | | | |
|---|---|---|---|
| 4,650,729 A * | 3/1987 | Nakamura et al. | 429/61 |
| 4,670,702 A | 6/1987 | Yamada et al. | |
| 5,302,471 A | 4/1994 | Ito et al. | |
| 2003/0138676 A1 | 7/2003 | Leban | |
| 2003/0224224 A1 | 12/2003 | Okada et al. | |
| 2004/0219409 A1* | 11/2004 | Isogai | 429/26 |
| 2005/0206342 A1* | 9/2005 | Aleyraz et al. | 320/101 |

FOREIGN PATENT DOCUMENTS

JP    2004-081388    3/2004

\* cited by examiner

*Primary Examiner*—Akm E Ullah
*Assistant Examiner*—Johali A Torres Ruiz
(74) *Attorney, Agent, or Firm*—Oppedahl Patent Law Firm LLC

(57) ABSTRACT

A temperature sensor (13) and a heating device (14) are provided to prevent moisture from freezing i a direct methanol fuel cell (16). To achieve this, a secondary battery (17) is connected in parallel to the fuel cell. When the temperature drops to a predetermined level, the secondary battery, using electricity it as stored from the fuel cell, heats a ceramic device. This device is located near the fuel cell, the fuel container (15), or both. When the fuel cell again reaches the desired temperature, it begins normal operations and also recharges the secondary battery. The heating system is prevented from working if a fuel container is not installed in a battery pack or if the battery pack is not connected to an electronic device or if that electronic device is turned off.

7 Claims, 1 Drawing Sheet

DIRECT METHANOL FUEL CELL PACK HEATING SYSTEM

CROSS-REFERENCE TO RELATED APPLICATIONS

This application claims priority from U.S. application Ser. No. 60/521,654 filed Jun. 11, 2004, which application is incorporated herein by reference for all purposes.

BACKGROUND

Due to the chemical reaction process in a fuel cell, the fuel cell generates moisture. In cold environments that moisture needs to be prevented from freezing.

Many patents and patent publications discuss direct methanol fuel cells and approaches for controlling the temperature thereof. These include U.S. Pat. No. 4,650,729 to Nakamura et al., U.S. Pat. No. 6,387,556 to Fuglevand et al., and PCT publication no. WO 2004/017447 to Mardilovich et al.

SUMMARY OF THE INVENTION

A temperature sensor and a heating device are provided to prevent moisture from freezing in a direct methanol fuel cell. To achieve this, a secondary battery is connected in parallel to the fuel cell. When the temperature drops to a predetermined level, the secondary battery, using electricity it has stored from the fuel cell, heats a ceramic device. This device is located near the cell, the fuel container or both. When the fuel cell again reaches the desired temperature, it begins normal operations and also charges again the secondary battery. The heating system is prevented from working if a fuel container is not installed in a battery pack or if the battery pack is not connected to an electronic device or if that electronic device is turned off.

DETAILED DESCRIPTION

Figure 1:
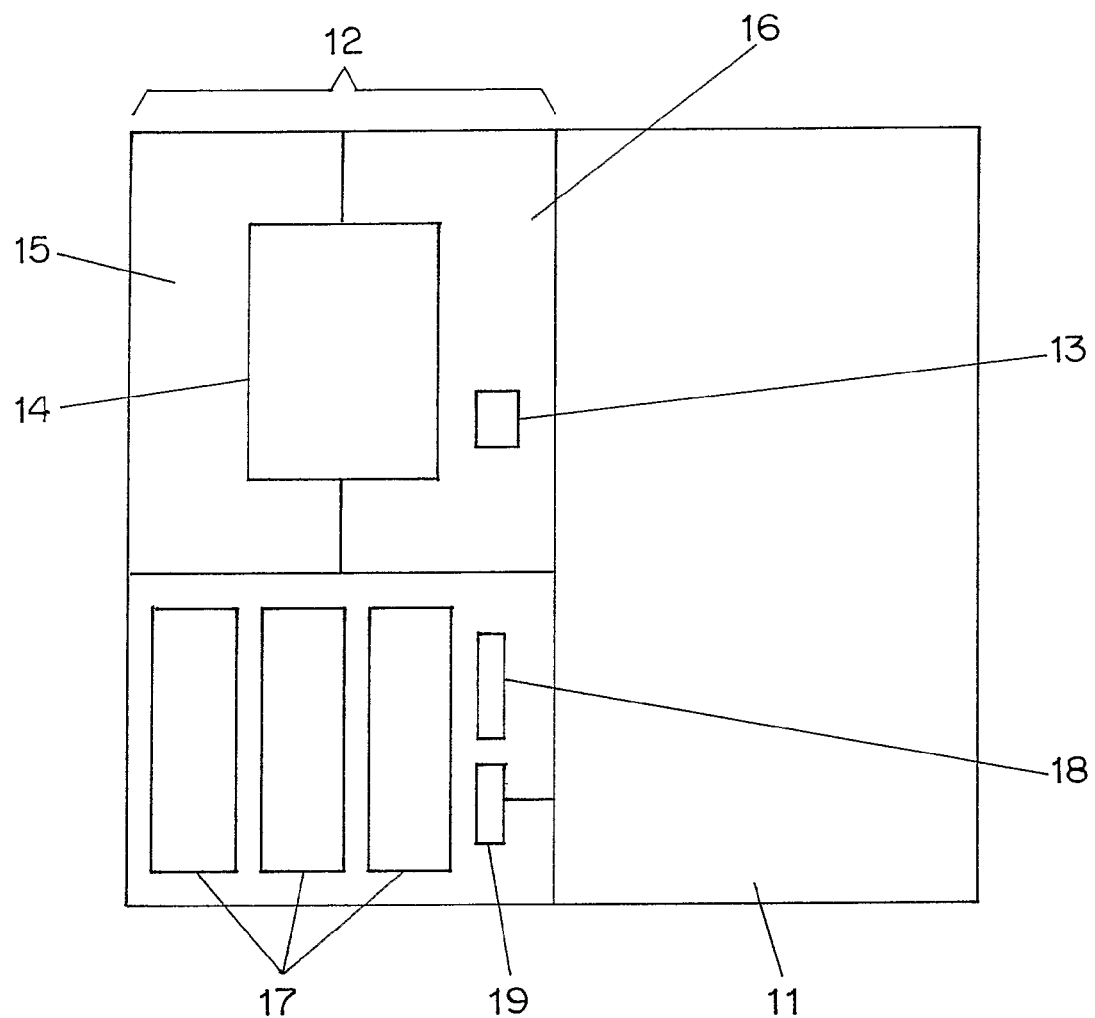
FIG. 1 shows an embodiment of the invention.

As shown in FIG. 1, a temperature sensor 13 and a heating device 14 are provided to prevent moisture from freezing in a direct methanol fuel cell 16. To achieve this, a secondary battery 17 is connected in parallel to the fuel cell 16. When the temperature drops to a predetermined level, the secondary battery 17, using electricity it has stored from the fuel cell 16, heats a heating device 14 that is typically a ceramic device. This device 14 is located near the cell 16, the fuel container 15 or both. When the fuel cell 16 again reaches the desired temperature, it begins normal operations and also charges again the secondary battery 17. The heating system is prevented from working if a fuel container 15 is not installed in a battery pack 12 or if the battery pack 12 is not connected to an electronic device 11 or if that electronic device 11 is turned off.

One way to choose to disconnect the secondary battery from the heating element, and to choose to commence recharging the secondary battery from the output of the fuel cell, is to make this choice based upon the sensed temperature rising above some second predetermined threshold. Another way to do this is to sense when the fuel cell is delivering some threshold amount of current at some threshold voltage, and to use these events to choose to disconnect the heating element and to recharge the secondary battery.

It will be appreciated that when the fuel container is connected to the battery pack, it is disposed to deliver fuel to the fuel cell.

The secondary battery may be literally in parallel with the fuel cell. In an exemplary embodiment, however, the connection between the fuel cell and the secondary battery is via a charging circuit that protects against overcharging of the secondary battery. In a simple case the secondary battery may have a voltage, when fully charged, that is less than the voltage output of the fuel cell, meaning that the fuel cell can charge the secondary battery directly. Alternatively, the secondary battery may have a voltage, when fully charged, that is higher than the output voltage of the fuel cell, in which case the charging circuit may contain a DC-to-DC voltage converter, for example a switching power supply, to develop such voltage as is needed to charge the secondary battery.

The type of battery employed for the secondary battery is preferably selected from a technology and chemistry that permits satisfactory function (here, development of power for the heating element) even at temperatures that are below the temperature at which the fuel cell requires heating. Stated differently, the battery is selected so that it operates even at temperatures that are below the operating temperature of the fuel cell.

It is perhaps instructive to discuss in some detail the context for the invention. Many fuel cell systems, including some of the systems described in the above-mentioned patents, are large non-portable fuel cells employed to power a house or building. Such fuel cells are typically used in a setting where alternative power is available from a mains (AC) power grid. Some such systems use power from a power grid for temperature conditioning. The context of the invention, however, is a portable system in which mains (AC) power is not necessarily available. Typical applications might include a small consumer electronic device such as a wireless telephone or a notebook computer, where light weight, small size, and independence from a power grid are important features.

Describing this embodiment in more detail, in this exemplary embodiment, battery pack 12 contains, among other things, a fuel container 15, a direct methanol fuel cell 16, a heating device 14, a temperature sensor 13, a secondary battery 17, a control circuit 18, and a battery installation detection switch 19. The secondary battery 17 and fuel cell 16 are typically within a single housing.

As shown in FIG. 1, the battery pack 12 is connected to equipment 11 (often termed a "load") which is to be powered by the battery pack 12. The equipment 11 may have a power switch so that it may be turned on and off.

Those skilled in the art will have no difficulty devising myriad obvious improvements and variants of the invention without undue experimentation, all of which are intended to be encompassed within the claims which follow.

The invention claimed is:

1. A method for operating a battery pack cell adapted to be connectable to a load capable of being turned on and off; the battery pack comprising a fuel cell, wherein said battery pack is adapted to be connectable to a fuel container; the battery pack further comprising a control means for connecting the secondary battery to the heating element in the event of the sensed temperature being below a first predetermined level; wherein said control means is responsive to a temperature sensed at the temperature sensor, and is responsive to the condition of the load being connected or not, and is responsive to the condition of the load being turned on or not, and is responsive to the condition of a fuel container being connected to the battery pack or not, and is responsive to the event of a load being connected and being turned on, and is responsive to the event of a fuel container being connected to the battery pack; the method comprising the steps of:

operating the fuel cell and charging a secondary battery therefrom, the fuel cell and secondary battery both within a housing;

thereafter, sensing a temperature at the fuel cell;

in the event of the control-means-sensed temperature dropping to a predetermined level, and in the event of a control-means-sensed fuel container being installed to the battery pack, and in the event of the battery pack being connected to a control-means-sensed load, and in the event of the control-means-sensed load not being off, connecting the secondary battery to a heating element in thermally conductive communication with the fuel cell, thereby warming the fuel cell.

2. The method of claim 1 further comprising the step, performed after the warming, of again charging the secondary battery from operation of the fuel cell.

3. The method of claim 1 further comprising the step, performed after the warming, of disconnecting the secondary battery from the heating element.

4. A battery pack comprising:

a housing;

a fuel cell within the housing;

a temperature sensor in thermally conductive communication with the fuel cell;

a heating element in thermally conductive communication with the fuel cell;

a secondary battery within the housing;

the secondary battery selected to permit development of power to heat the heating element even when the temperature of the secondary battery is below the operating temperature of the fuel cell;

the battery pack disposed to be connectable to a load that can be turned on and off;

the battery pack disposed to be connectable to a fuel container, the fuel container when connected to the battery pack disposed to deliver fuel to the fuel cell;

control means for connecting the secondary battery to the heating element in the event of the sensed temperature being below a first predetermined level, wherein said control means is responsive to a temperature sensed at the temperature sensor, and is responsive to the condition of the load being connected or not, and is responsive to the condition of the load being turned on or not, and is responsive to the condition of a fuel container being connected to the battery pack or not, and is responsive to the event of a load being connected and being turned on, and is responsive to the event of a fuel container being connected to the battery pack.

5. The battery pack of claim 4 wherein the fuel cell is a direct methanol fuel cell.

6. The battery pack of claim 4 wherein the control means is further responsive to an event of the sensed temperature rising above a second predetermined level by disconnecting the secondary battery from the heating element, and by recharging the secondary battery from an output from the fuel cell.

7. The battery pack of claim 4 wherein the control means is further responsive to an event of the fuel cell developing some predetermined amount of power, by disconnecting the secondary battery from the heating element, and by recharging the secondary battery from an output from the fuel cell.

* * * * *

UNITED STATES PATENT AND TRADEMARK OFFICE
CERTIFICATE OF CORRECTION

PATENT NO. : 7,579,806 B2  Page 1 of 1
APPLICATION NO. : 11/569467
DATED : August 25, 2009
INVENTOR(S) : Tadashi Okuto It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 546 days.

Signed and Sealed this

Fourteenth Day of September, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,579,806 B2 | Page 1 of 1 |
| APPLICATION NO. | : 11/569467 | |
| DATED | : August 25, 2009 | |
| INVENTOR(S) | : Okuto | |

It is certified that error appears in the above-identified patent and that said Letters Patent is hereby corrected as shown below:

On the Title Page
Item Assignee: should read,

Sendyne Corporation
New York, NY

Signed and Sealed this
Twenty-eighth Day of February, 2012

David J. Kappos
*Director of the United States Patent and Trademark Office*